(12) United States Patent
Chakraborty et al.

(10) Patent No.: US 10,845,977 B2
(45) Date of Patent: Nov. 24, 2020

(54) METHOD AND APPARATUS FOR DISPLAYING CONTENT

(71) Applicant: Samsung Electronics Co., Ltd., Gyeonggi-do (KR)

(72) Inventors: Tuhin Chakraborty, Karnataka (IN); Kiran Prasanth Rajan, Karnataka (IN); Debayan Mukherjee, Karnataka (IN); Saumitri Choudhury, Karnataka (IN); Suraj Govind Chiplunkar, Karnataka (IN); Sanjay Ghosh, Karnataka (IN); Vanraj Vala, Karnataka (IN); Vishnupriya Surendranath Kaulgud, Karnataka (IN); Shailija Pahuja, Karnataka (IN); Vinayak Pancholi, Karnataka (IN); Sherene Kuruvilla, Karnataka (IN); Hema Aravindan, Karnataka (IN); Devyani Jain, Karnataka (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/306,820

(22) PCT Filed: Jun. 5, 2017

(86) PCT No.: PCT/KR2017/005871
§ 371 (c)(1),
(2) Date: Dec. 3, 2018

(87) PCT Pub. No.: WO2017/209584
PCT Pub. Date: Dec. 7, 2017

(65) Prior Publication Data
US 2019/0121531 A1    Apr. 25, 2019

(30) Foreign Application Priority Data

Jun. 3, 2016   (IN) .............................. 201641019214
Jun. 2, 2017   (IN) .............................. 201641019214

(51) Int. Cl.
*G06F 3/048*    (2013.01)
*G06F 3/0484*    (2013.01)
(Continued)

(52) U.S. Cl.
CPC ........ *G06F 3/04847* (2013.01); *G06F 3/0483* (2013.01); *G06F 3/0488* (2013.01);
(Continued)

(58) Field of Classification Search
CPC .. G06F 3/0482; G06F 3/0485; G06F 3/04847; G06F 3/0483; G06F 3/04842;
(Continued)

(56) References Cited

U.S. PATENT DOCUMENTS

| 7,536,650 B1 | 5/2009 | Robertson et al. |
| 2006/0268100 A1* | 11/2006 | Karukka ........... H04M 1/72583 |
| | | 348/14.01 |

(Continued)

FOREIGN PATENT DOCUMENTS

| EP | 2 538 354 | 12/2012 |
| WO | WO 2011084859 | 7/2011 |

OTHER PUBLICATIONS

Marcelo Cohen et al., Focus and Context for Volume Visualization, Jan. 1, 2004, Proceedings Theory and Practice of Computer Grahics, 2004, pp. 32-39 (Year: 2004).*

(Continued)

*Primary Examiner* — Tam T Tran
(74) *Attorney, Agent, or Firm* — The Farrell Law Firm, P.C.

(57) ABSTRACT

The disclosure herein provide a technical solution of a method comprising detecting a focus area within a graphical window of an application displayed on a screen of the electronic device, detecting at least one data item of the application in the focus area, and displaying the at least one (Continued)

In-focus contact card

Semi-focus contact card data item with contextually related content corresponding to the at least one data item in the focus area in response to the detecting.

13 Claims, 17 Drawing Sheets

(51) Int. Cl.
  *H04N 21/4722* (2011.01)
  *H04N 21/4728* (2011.01)
  *G06F 3/0488* (2013.01)
  *H04N 21/4223* (2011.01)
  *H04N 21/442* (2011.01)
  *G06F 3/0483* (2013.01)

(52) U.S. Cl.
  CPC ..... *G06F 3/04842* (2013.01); *H04N 21/4223* (2013.01); *H04N 21/44218* (2013.01); *H04N 21/4722* (2013.01); *H04N 21/4728* (2013.01)

(58) Field of Classification Search
  CPC .............. G06F 3/0488; H04N 21/4722; H04N 21/4728
  See application file for complete search history.

(56) References Cited

U.S. PATENT DOCUMENTS

| | | | | |
|---|---|---|---|---|
| 2007/0266411 | A1* | 11/2007 | Yamamoto | A63F 13/10 725/88 |
| 2009/0002335 | A1* | 1/2009 | Chaudhri | G06F 16/904 345/173 |
| 2009/0049381 | A1 | 2/2009 | Robertson et al. | |
| 2009/0106674 | A1* | 4/2009 | Bray | G06F 16/156 715/762 |
| 2009/0203408 | A1 | 8/2009 | Athas et al. | |
| 2014/0026156 | A1 | 1/2014 | Deephanphongs | |
| 2014/0143812 | A1 | 5/2014 | Smith et al. | |
| 2014/0237495 | A1 | 8/2014 | Jang et al. | |
| 2014/0304651 | A1 | 10/2014 | Johansson et al. | |
| 2015/0066165 | A1* | 3/2015 | Everette | G06F 3/0485 700/83 |

OTHER PUBLICATIONS

Marcelo Cohen et al., Focus and Context for Volume Visualization, Jan. 1, 2004, IEEE Xplore, pp. 1-8 (Year: 2004).*
Robert Kincaid, SignalLens: Focus+Context Applied to Electronic Time Series, Nov. 1, 2010, IEEE Xplore, vol. 16, No. 6, pp. 900-907 (Year: 2010).*
James Whalley et al., "The Optimal Focus Position When Scrolling Using a Small Display", IFIP International Federation for Information Processing, Sep. 12, 2005, 4 pages.
Simon Edstrom, "Improving Web Browsing on Mobile Devices Using Focus and Zooming", XP-002678454, Jun. 3, 2010, 12 pages.
Edward Lank et al., "Focus+Context Sketching on a Pocket PC", CHI 2004, Late Breaking Results Paper, ACM, Apr. 24-29, 2004, XP 040178973, 4 pages.
European Search Report dated Jan. 25, 2019 issued in counterpart application No. 17807077.7-1208, 9 pages.
PCT/ISA/210 Search Report issued on PCT/KR2017/005871, pp. 3.
PCT/ISA/237 Written Opinion issued on PCT/KR2017/005871, pp. 8.

* cited by examiner

[Fig. 1]
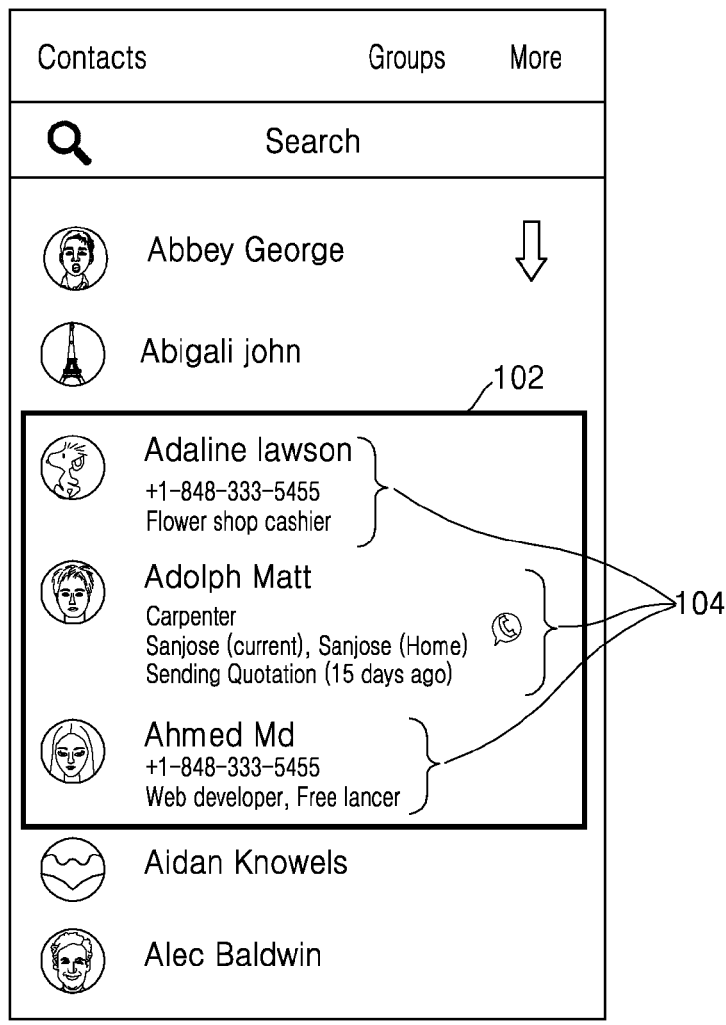
[Fig. 2]
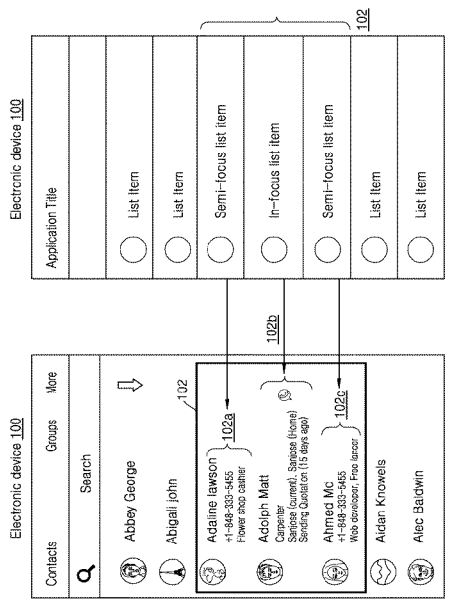

[Fig. 3A]
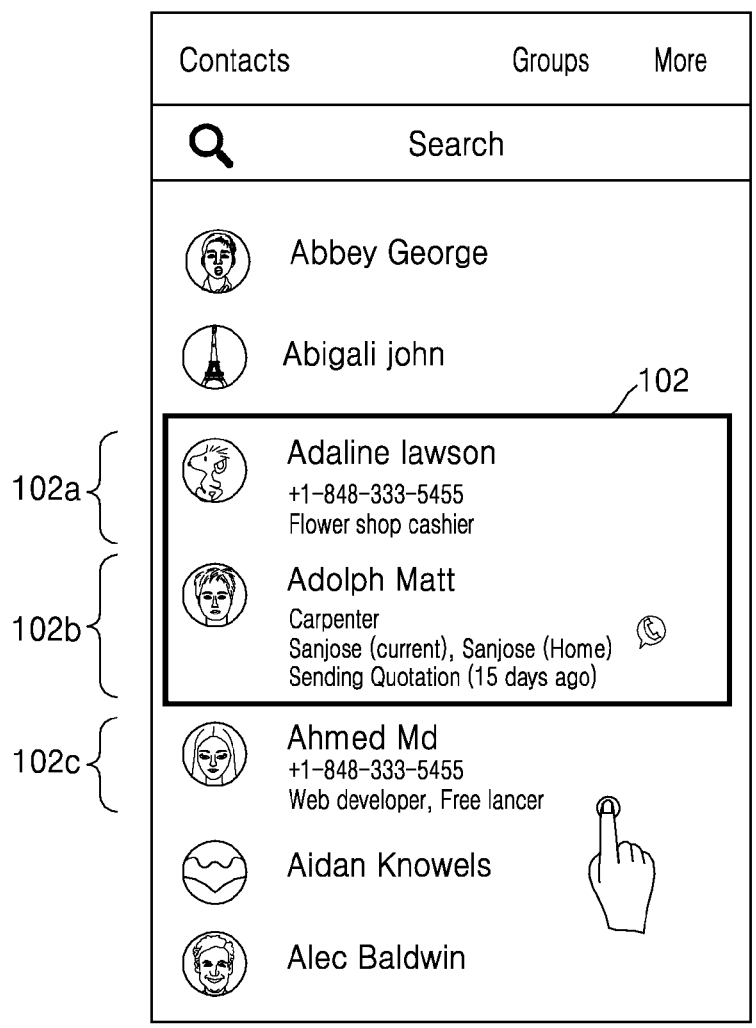

[Fig. 3B]
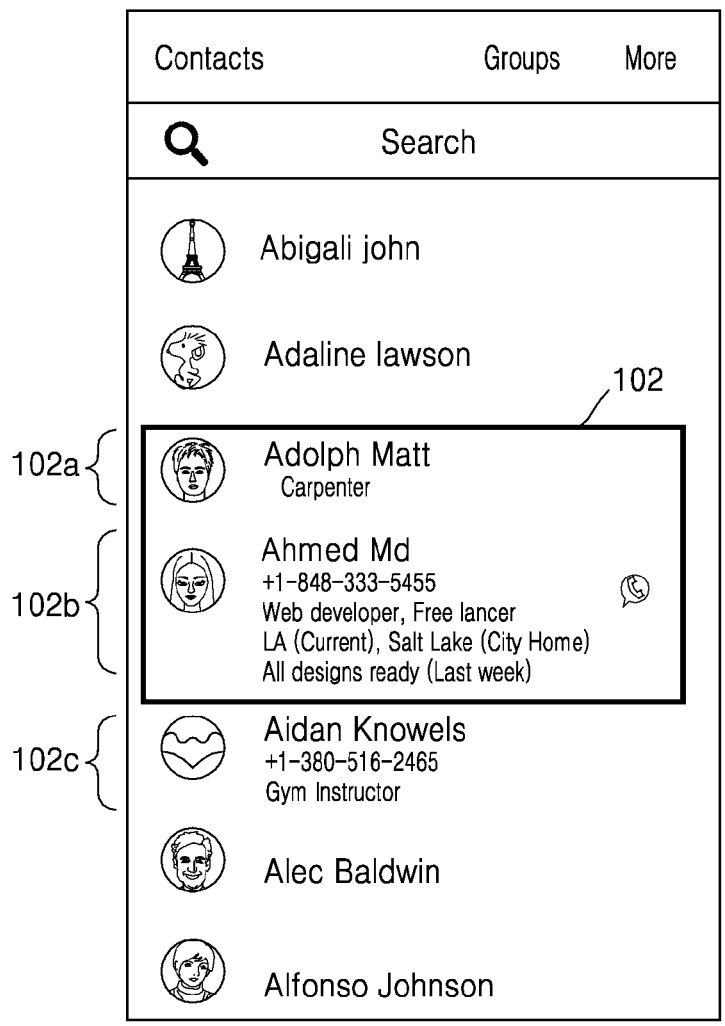

[Fig. 3C]
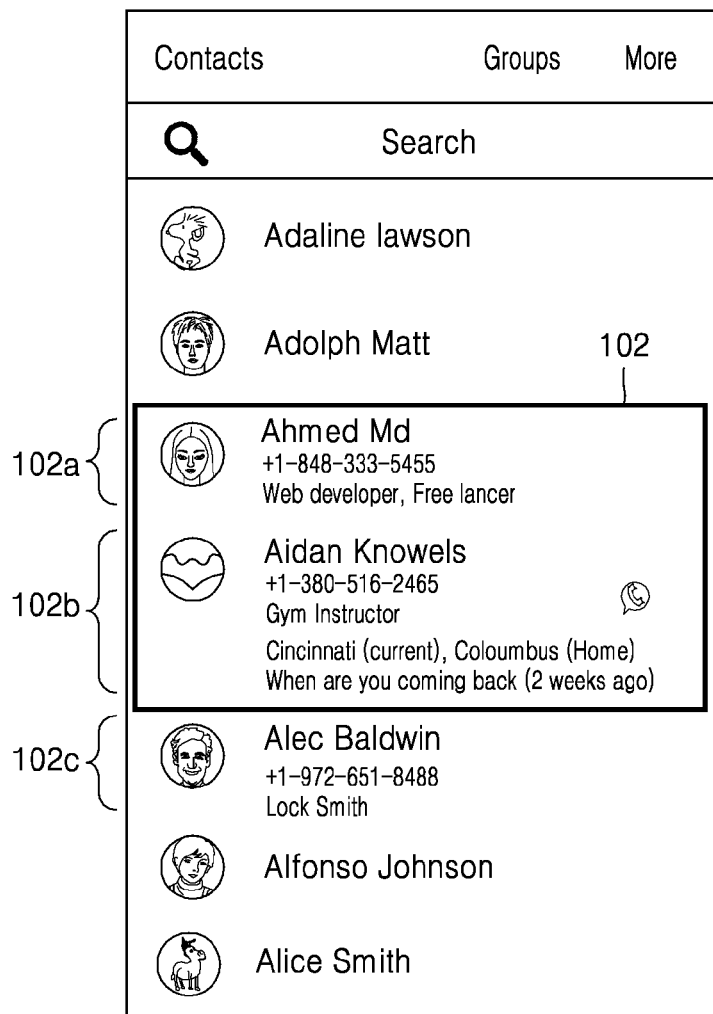

[Fig. 4A]
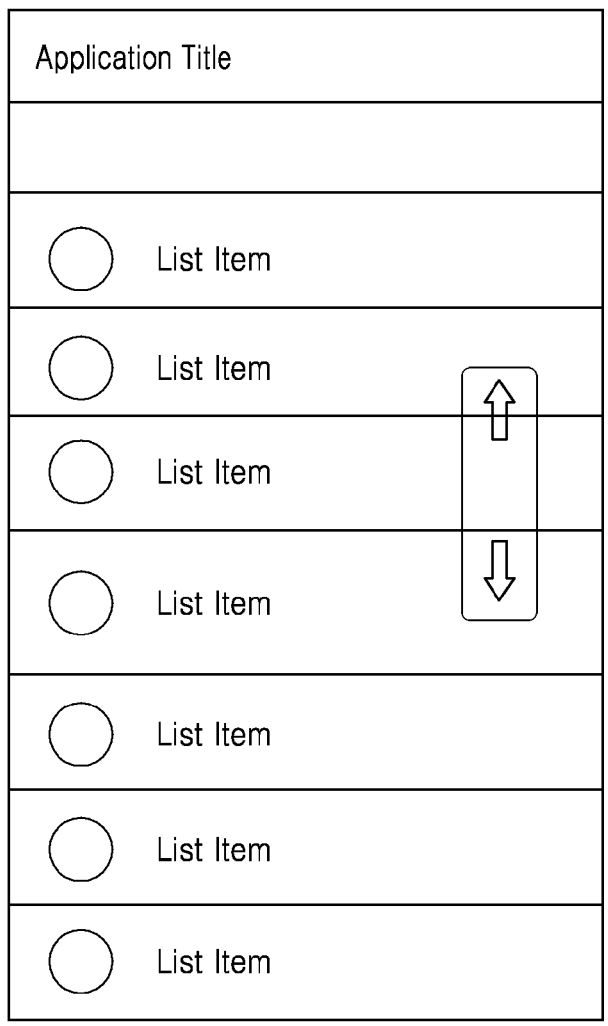

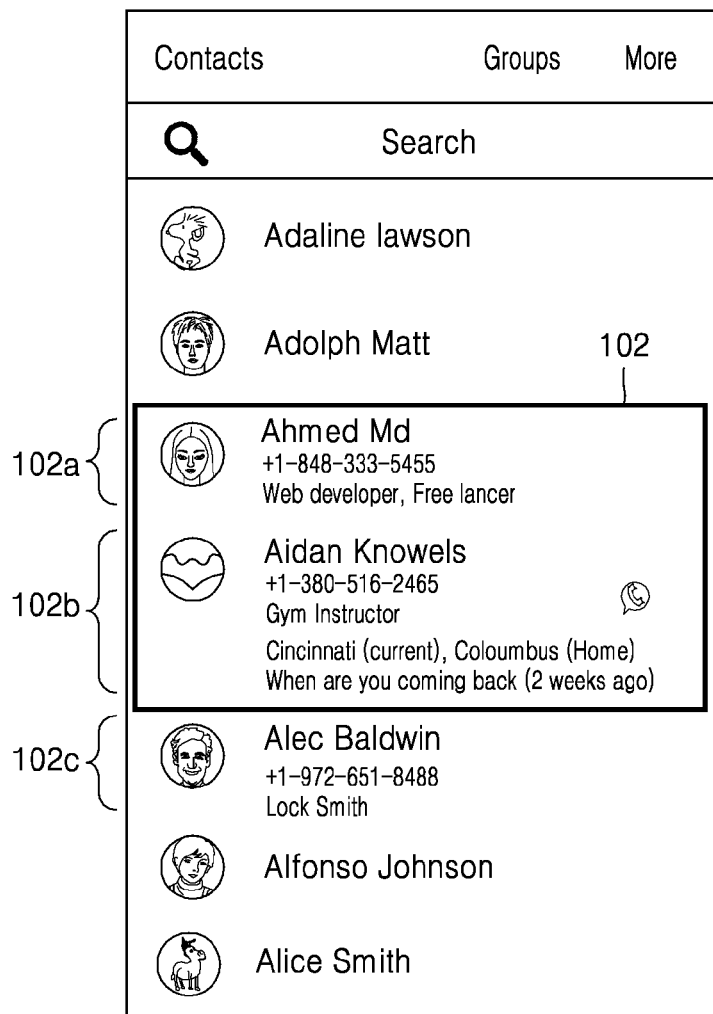
[Fig. 4B]

[Fig. 5]
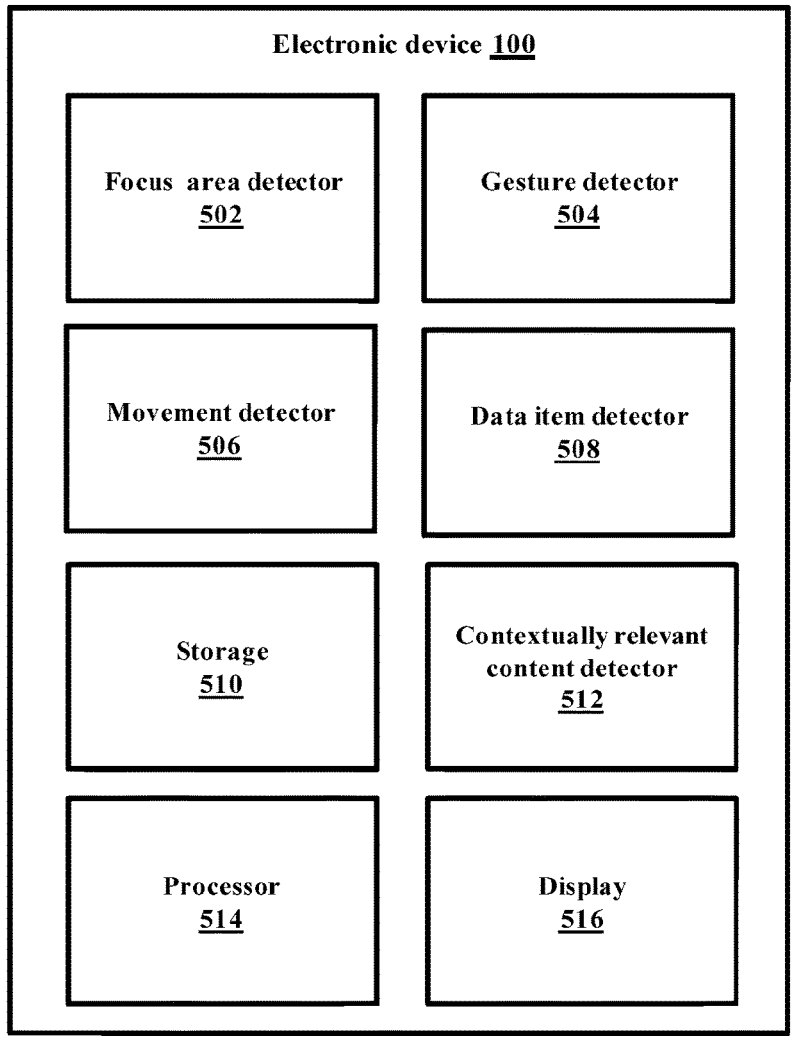
[Fig. 6]
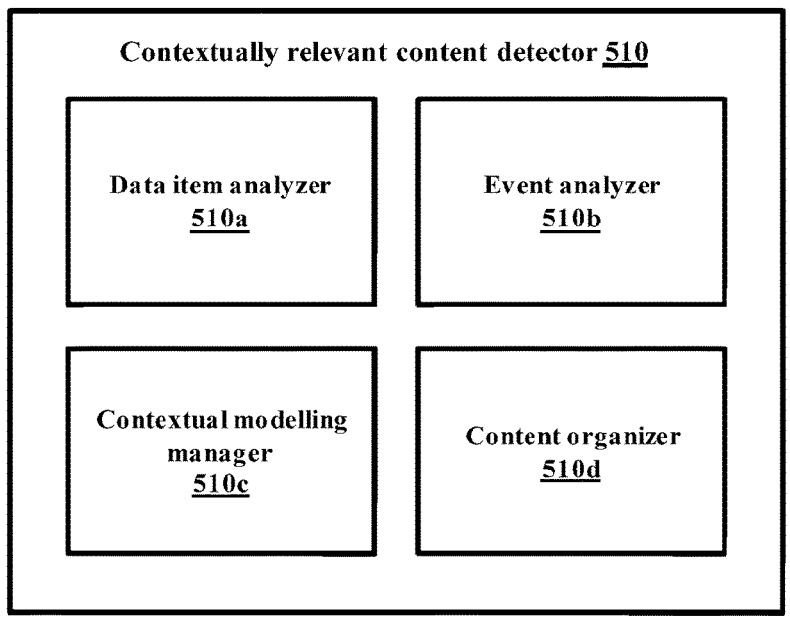

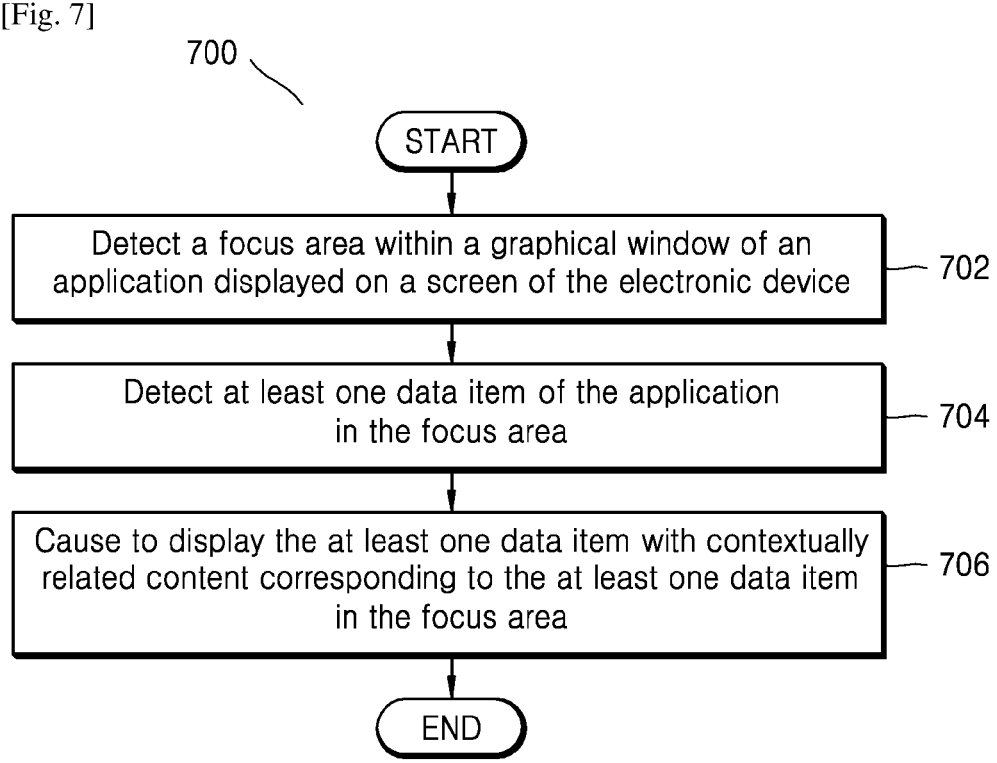

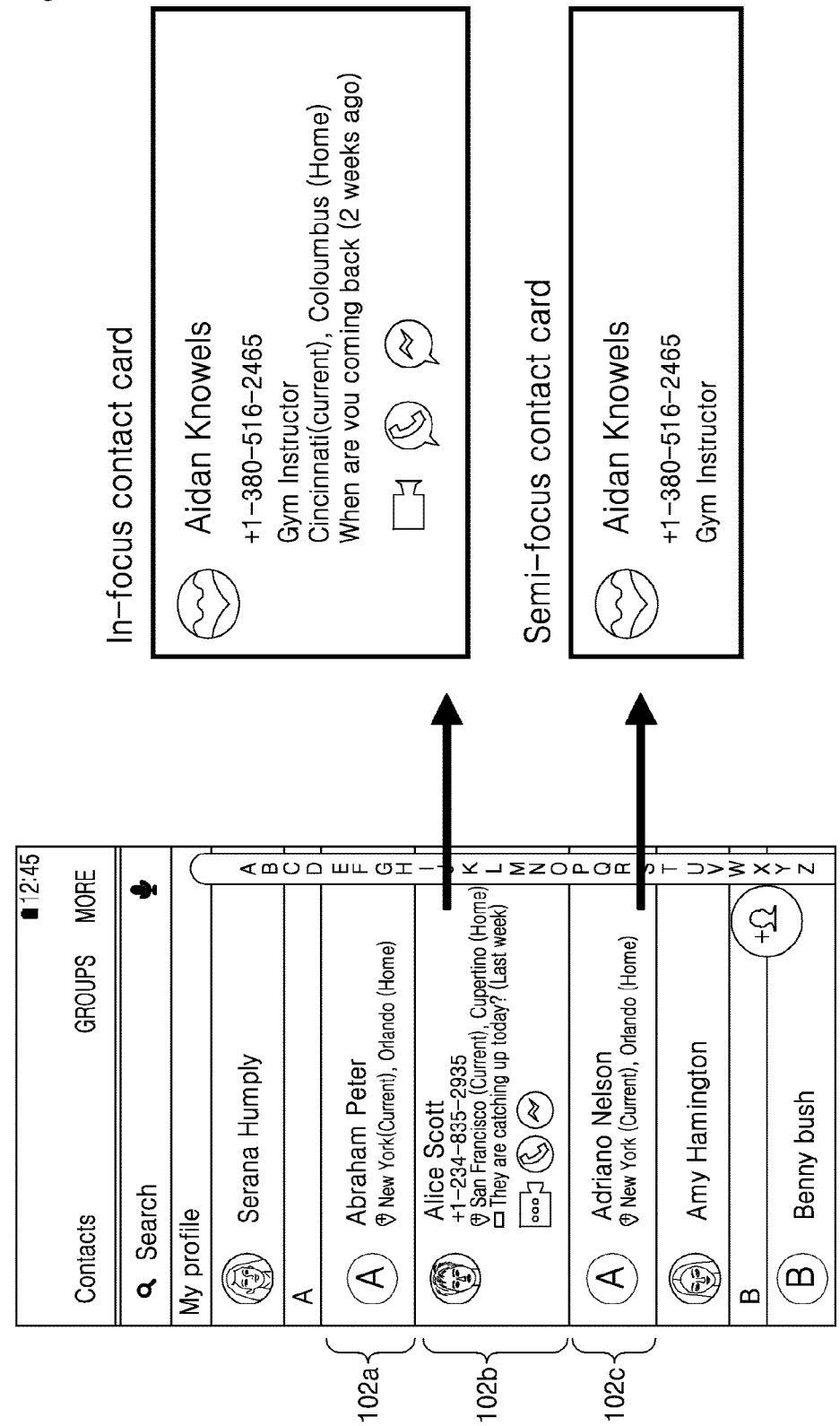
[Fig. 8A]

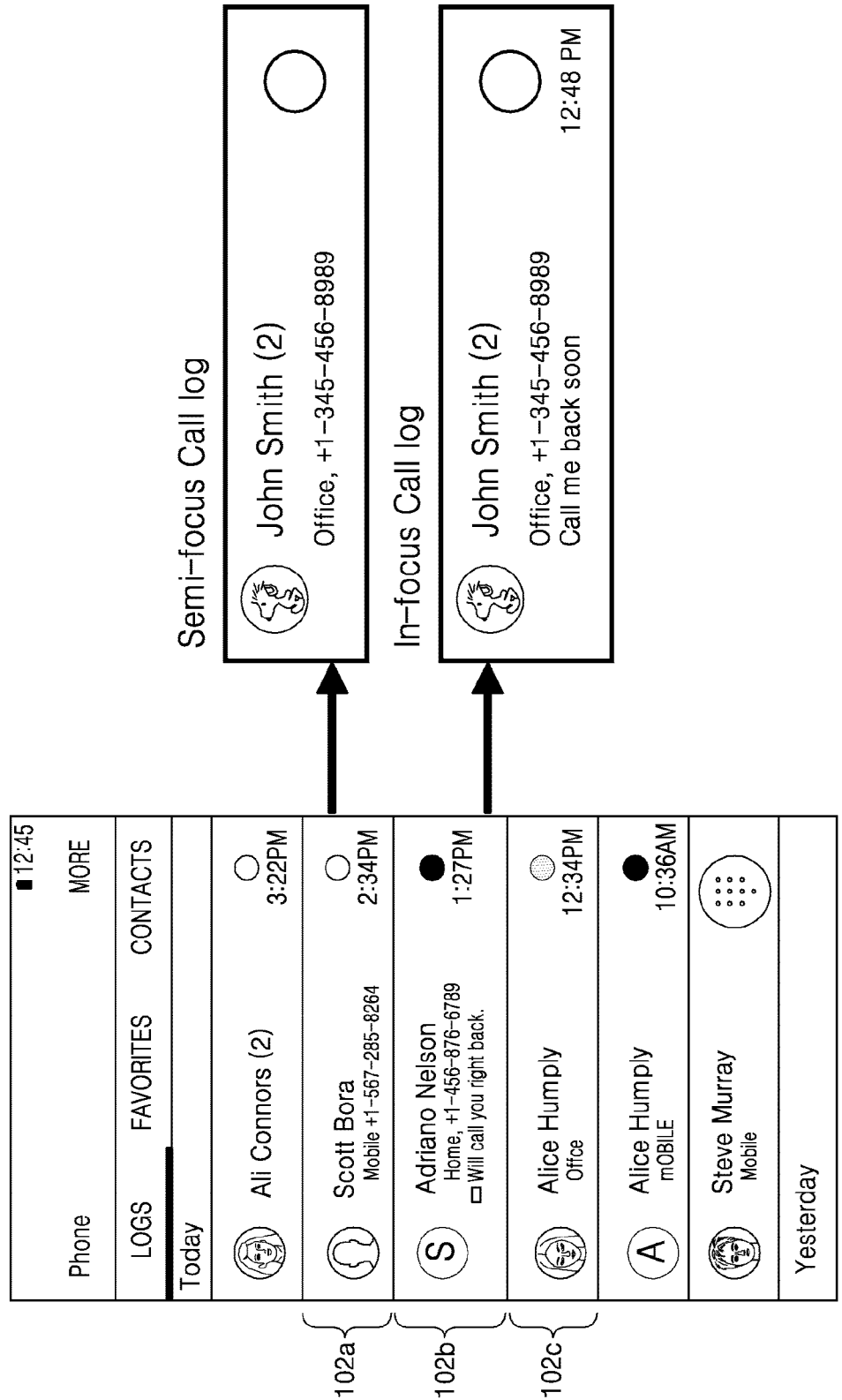
[Fig. 8B]

[Fig. 8C]
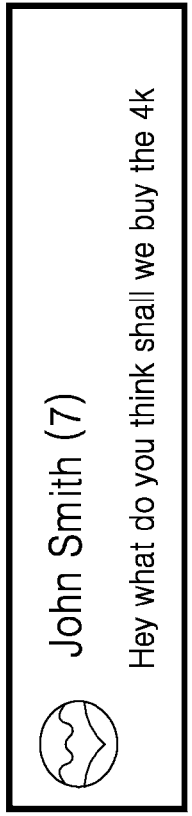
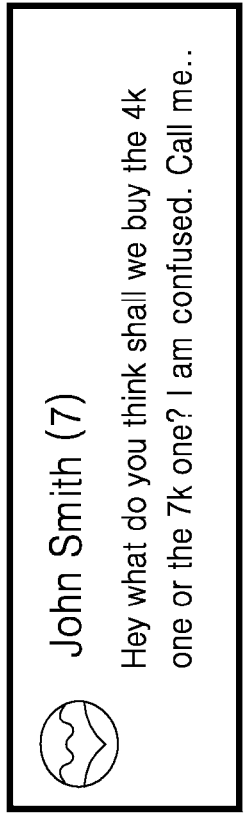

[Fig. 8D]

| | |
|---|---|
| ⬆️📱📶✉️ 📶 73% 🔋 12:02 | In-focus view — 102b |
| Settings           SEARCH | Wi-Fi |
| Security | Not connected Scan |
| 📶 Wi-Fi | Searching available connections |
| ✈ Bluetooth | |
| ✈ Airplane mode | Semi-focus view — 102a or 102c |
| 📱 Mobile hotspot Andriod AP | Bluetooth |
| 📶 Data usage ✕ switch to 2G 3G Data 345.6 mb | Not paired    Scan |
| 📱 SIM card manager Vodafone Sim1 | |
| 📱 Mobile networks | |
| 📱 NFC and payment | |
| 📱 More connection settings | |

[Fig. 9]
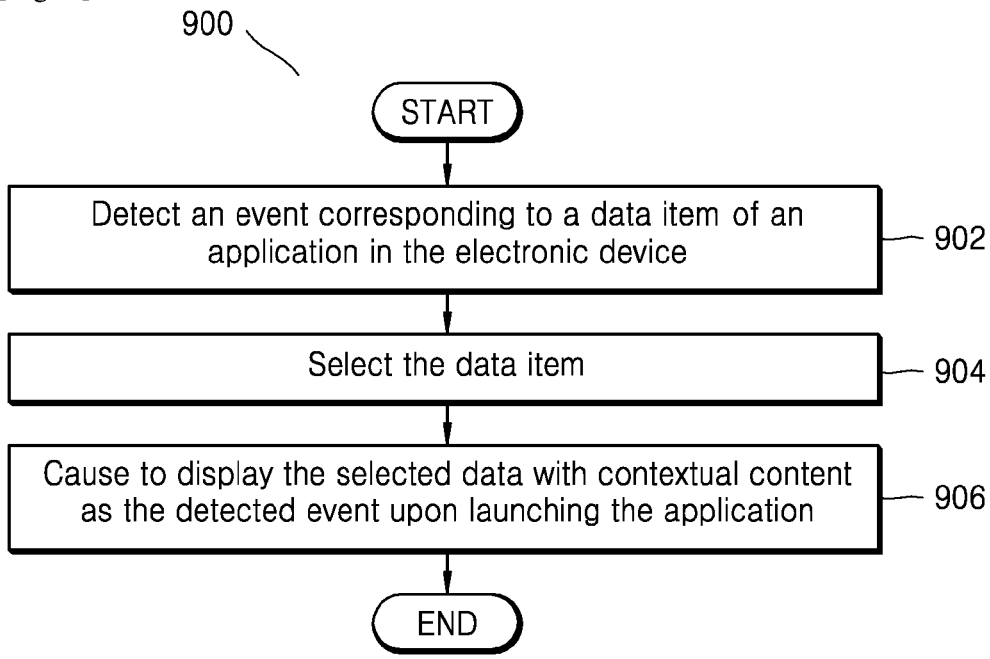
[Fig. 10]
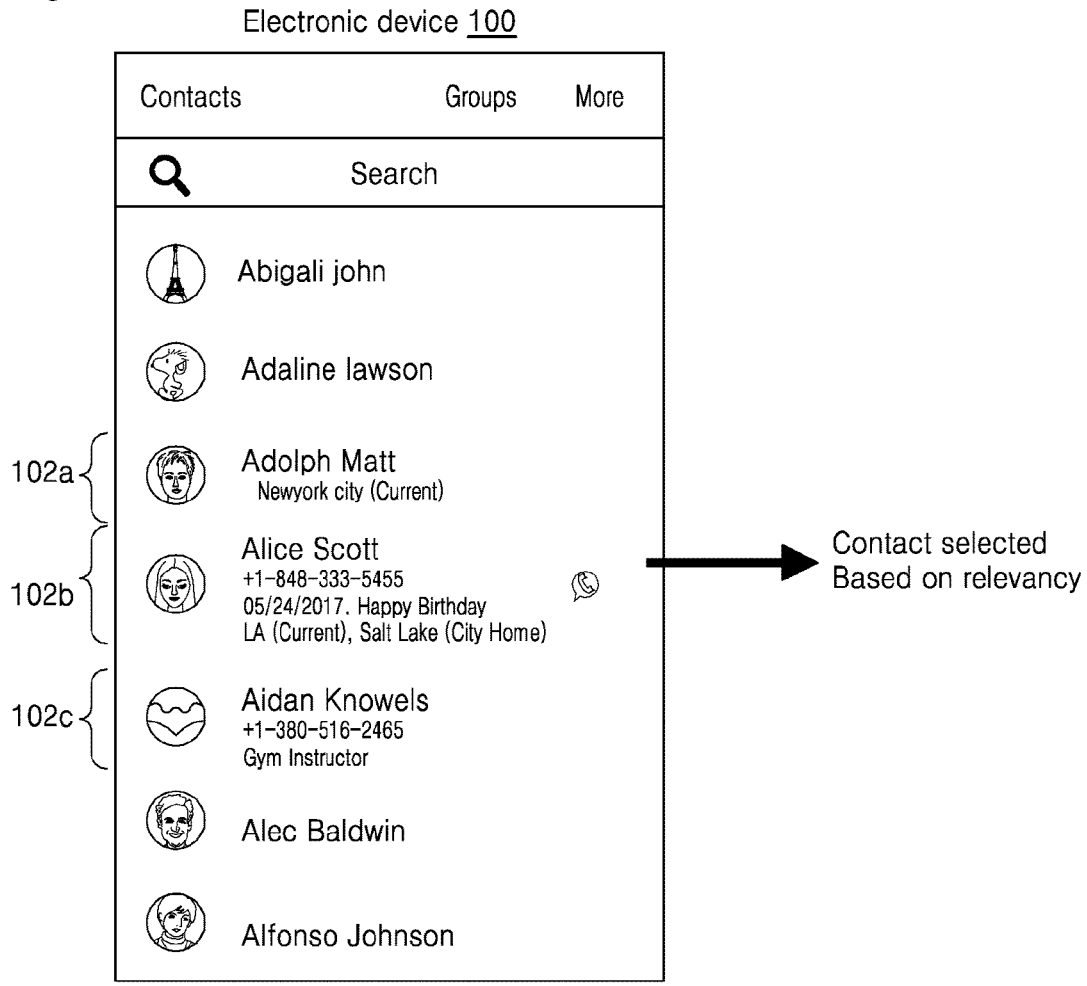

[Fig. 11]
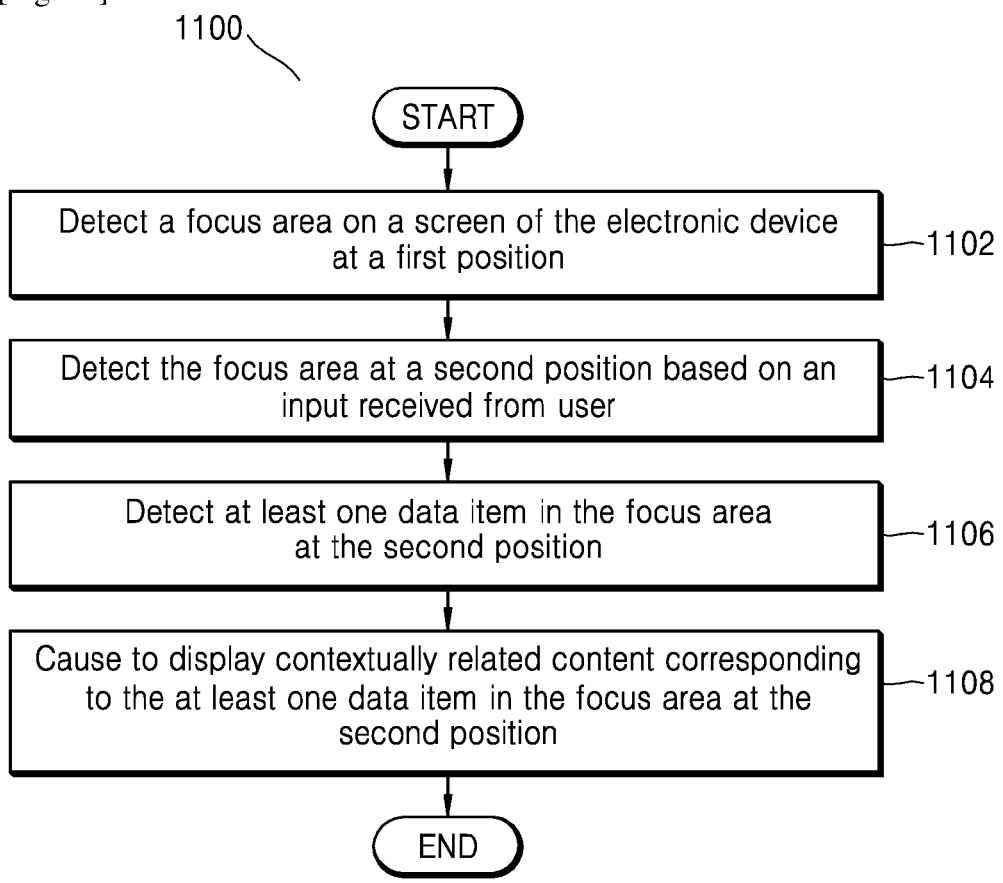

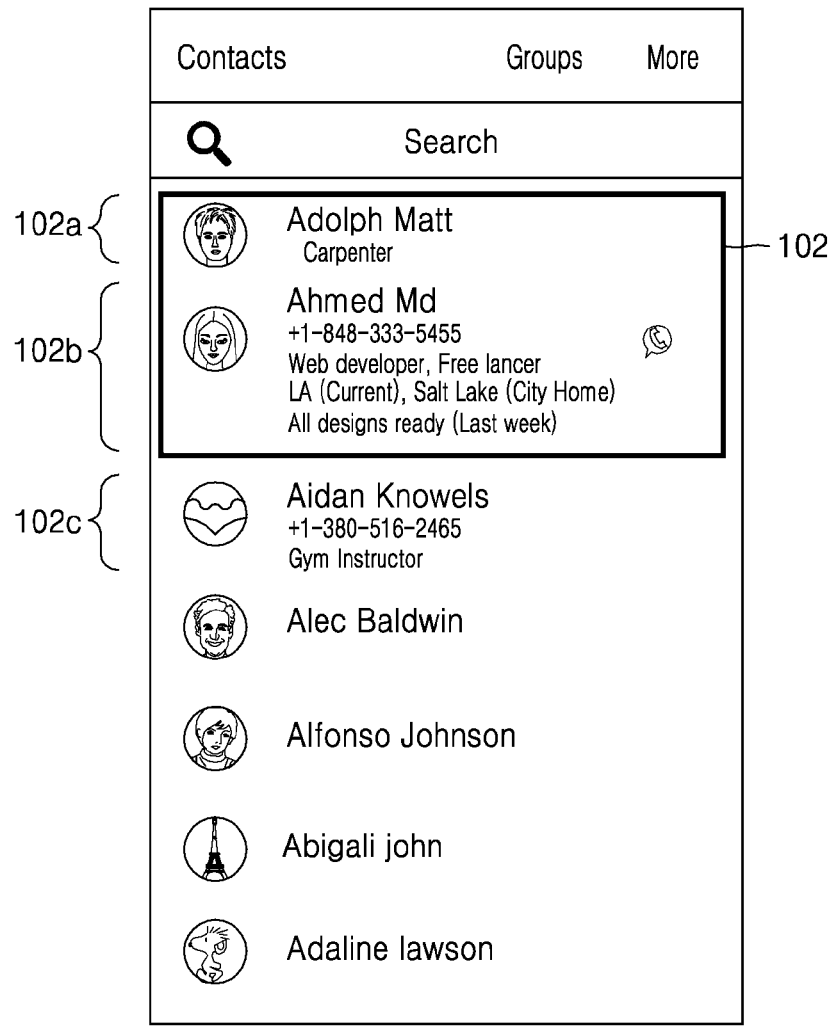
[Fig. 12A]

[Fig. 12B]
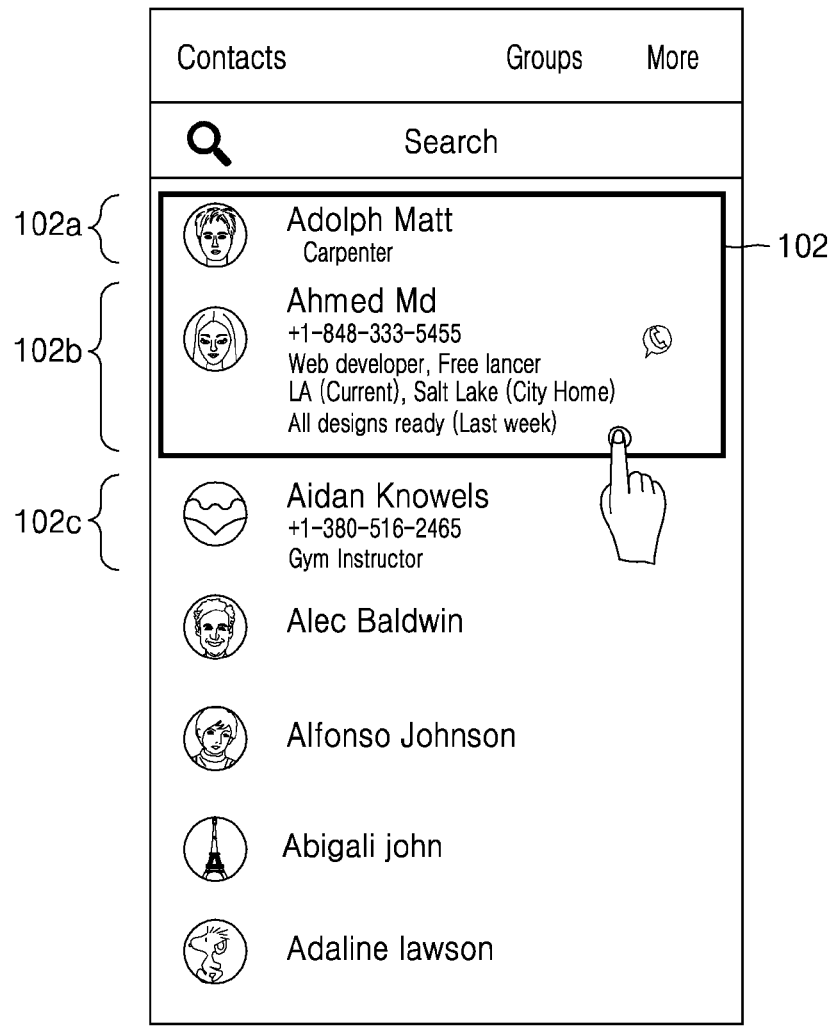

[Fig. 12C]
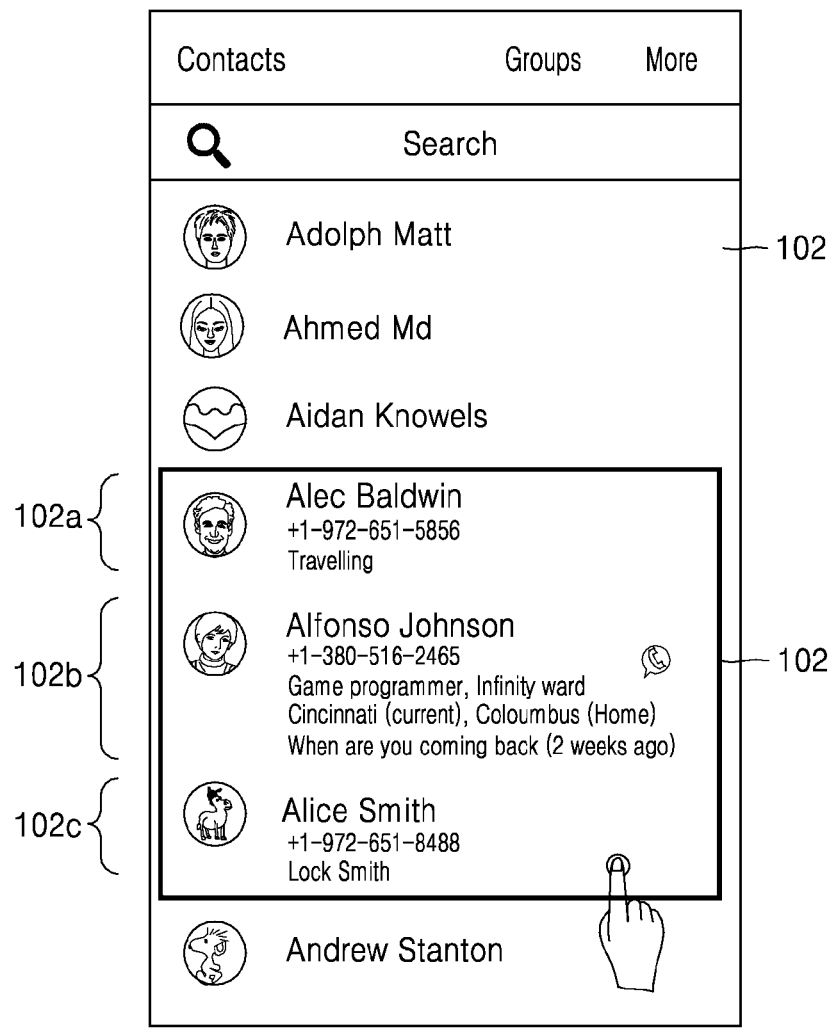

METHOD AND APPARATUS FOR DISPLAYING CONTENT

PRIORITY

This application is a National Phase Entry of PCT International Application No. PCT/KR2017/005871, which was filed on Jun. 5, 2017, and claims priority to Indian Patent Application Nos. 201641019214 (PS) and 201641019214 (CS), filed on Jun. 3, 2016 and Jun. 20, 2017, respectively, the content of each of which are incorporated herein by reference.

TECHNICAL FIELD

The technical field herein relates to an electronic device, and more particularly to a method and an apparatus for automatically displaying content related to a data item.

BACKGROUND ART

The electronic devices (e.g., cellular telephones, personal digital assistants (PDAs), cameras and video devices, among many other devices) that display information, including data inputted by the user are well known.

The displayed data often includes menu entries such as contact items, commands, and general data items including names and telephone numbers and other alphanumeric information, which may be added and deleted at the user's convenience and choice. In general, a user interface (UI) on which these menu entries or components are displayed is static in nature and doesn't support dynamic user experiences. The UI contains a set of data items which contain a lot of information which is hidden one or two levels beneath a list that contains the data items.

The data item does not allow this information to be displayed on a touch panel of the electronic device without user interaction. Further, the amount of information displayed in the data item is decided by an application developer and is constant. The user cannot decide the amount or nature of information displayed on the touch panel of the electronic device. In existing systems, the user has to interact with the data item in order to make extra information displayed upfront. For example, in a contact application, the user has to interact with the contact item to view or extract various information such as email ID of the contact, occupation of the contact and so on.

The above information is presented as background information only to help the reader to understand the present invention. Applicants have made no determination and make no assertion as to whether any of the above might be applicable as Prior Art with regard to the present application.

DISCLOSURE OF INVENTION

Solution to Problem

The disclosure herein provide a technical solution of a method comprising detecting a focus area within a graphical window of an application displayed on a screen of the electronic device, detecting at least one data item of the application in the focus area, and displaying the at least one data item with contextually related content corresponding to the at least one data item in the focus area in response to the detecting.

Advantageous Effects of Invention

The present disclosure provides an enhanced user interface and user experiences of automatically displaying content related to a data item based on a user input.

BRIEF DESCRIPTION OF DRAWINGS

This disclosure is illustrated in the accompanying drawings, throughout which like reference letters indicate corresponding parts in the various figures. The embodiments herein will be better understood from the following description with reference to the drawings, in which:

FIG. 1 illustrates an electronic device displaying a contact application in which each contact item in a focus area is expanded to display a contextually related content, according to an exemplary embodiment as disclosed herein;

FIG. 2 is an exemplary illustration in which the focus area is partitioned for displaying data items with contextually relevant content, according to an exemplary embodiment as disclosed herein;

FIGS. 3A through 3C are exemplary illustration in which one or more contact items are dynamically expanded to display contextually relevant content in the focus area based on a gesture on the contact application, according to an exemplary embodiment as disclosed herein;

FIGS. 4A and 4B are example illustrations in which the focus area is dynamically enabled on the screen of the electronic device based on speed of the gesture, according to an exemplary embodiment as disclosed herein;

FIG. 5 illustrates various hardware components of the electronic device for automatically displaying content related to the data item, according to an exemplary embodiment as disclosed herein;

FIG. 6 illustrates various components of a contextually relevant content detector of the electronic device, according to an exemplary embodiment as disclosed herein;

FIG. 7 is a flow diagram illustrating a method for automatically displaying content related to the data item, according to an exemplary embodiment as disclosed herein;

FIGS. 8A through 8D are example illustrations in which the data items are displayed with contextually relevant content in the focus area, according to an exemplary embodiment as disclosed herein;

FIG. 9 is a flow diagram illustrating a method for displaying the one or more data items with contextually relevant information in the focus area based on an event detected in the electronic device, according to an exemplary embodiment as disclosed herein;

FIG. 10 is an example illustration in which the data item is displayed with contextually relevant information in the focus area based on an event detected in the electronic device, upon launching an application, according to an exemplary embodiment as disclosed herein;

FIG. 11 is a flow diagram illustrating a method for dynamically shifting the focus area for viewing the one or more data items with contextually relevant content, according to an exemplary embodiment as disclosed herein; and FIGS. 12A through 12C are example illustrations in which the focus area is shifted from a first position to a second position based on an input received from the user, according to an exemplary embodiment as disclosed herein.

BEST MODE FOR CARRYING OUT THE INVENTION

In an exemplary embodiment, provided a method of detecting a focus area within a graphical window of an application displayed on a screen of the electronic device, detecting at least one data item of the application in the focus area, and displaying the at least one data item with contextually related content corresponding to the at least one data item in the focus area in response to the detecting.

Preferably, the detecting the focus area comprises detecting the focus are in response to an execution of an application containing the at least one data item in the electronic device, wherein the focus area is a pre-defined region.

Preferably, the detecting the at least one data item comprises detecting the at least one data item in response to a gesture input on an application containing the at least one data item.

Preferably, the focus area comprises an in-focus area and at least one semi-focus area.

Preferably, the method further comprises displaying the at least one data item contracted upon leaving the focus area.

Preferably, the focus area is dynamically enabled and disabled based on a scroll speed of the data item.

Preferably, a level of the contextually related content displayed in the in-focus area is greater than a level of the contextually related content displayed in the semi-focus area.

Preferably, the contextually relevant content comprises at least one of application data, an application icon and controls corresponding to the at least one data item.

Preferably, the at least one data item is dynamically selected to display the at least one data item with contextually relevant information in the focus area.

Preferably, the at least one data item is selected based on at least one detected event in the electronic device, upon launching the application containing the at least one data item.

In an exemplary embodiment, provided a method for automatically displaying content related to a data item, by an electronic device, the method comprising detecting a focus area within a graphical window of an application on a screen of the electronic device at a first position, detecting the focus area within the graphical window of the application at a second position based on an input received from a user, detecting at least one data item in the focus area, and displaying contextually related content corresponding to the at least one data item in the focus area at the second position in response to the detecting the at least one data item in the focus area.

In an exemplary embodiment, provided an electronic device for automatically displaying content, the electronic device comprising a focus area detector configured to detect a focus area within a graphical window of an application displayed on a screen of the electronic device, a data item detector configured to detect at least one data item of the application in the focus area, and a display configured to display the at least one data item with contextually related content corresponding to the at least one data item in the focus area in response to the detecting the at least one data item in the focus area.

Preferably, the focus area is a pre-defined region, wherein the focus area is detected when an application containing the at least one data item is executed in the electronic device.

Preferably, the data item detector configured to detect the at least one data item is detected in the focus area in response to a gesture on an application containing the at least one data item.

In an exemplary embodiment, provided an electronic device for automatically displaying content related to a data item, the electronic device comprising a focus area detector configured to detect a focus area within a graphical window of an application on a screen of the electronic device at a first position, and detect the focus area within the graphical window of the application at a second position based on an input received from user, a data item detector configured to detect at least one data item in the focus area; and a contextually relevant content detector configured to causing to display contextually related content corresponding to the at least one data item in the focus area at the second position, in response to detecting the at least one data item in the focus area.

In an exemplary embodiment, provided a method of detecting a focus area within a graphical window of an application displayed on a screen of the electronic device; detecting at least one data item of the application in the focus area; displaying the at least one data item with contextually related content corresponding to the at least one data item in the focus area in response to the detecting; shifting the focus area in an opposite direction to a scrolling direction of the at least one data item; and displaying a second data item related content corresponding to the second data item in the shifted focus area, wherein the displaying the contextually related content corresponding to the at least one data item ceased in response to the shifting of the focus area.

In an exemplary embodiment, provided a method of detecting a focus area within a graphical window of an application displayed on a screen of the electronic device; detecting at least one data item of the application in the focus area; displaying the at least one data item with contextually related content corresponding to the at least one data item in the focus area in response to the detecting; shifting the focus area in a scrolling direction of the at least one data item; and displaying a second data item related content corresponding to the second data item in the shifted focus area, wherein the displaying the contextually related content corresponding to the at least one data item is ceased in response to the shifting of the focus area.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the term data item refers to a contact item, an application icon, a menu component, a list item, text, a button, a graphical object, an application control or the like. Further, throughout the description, it is to be noted that the term data item, the list item and an item will have the same meaning.

The various embodiments herein achieve a method and electronic device for automatically displaying content related to a data item. The method includes detecting a focus area within a graphical window of an application displayed on a screen of the electronic device. Further, the method includes detecting at least one data item of the application in the focus area. Furthermore, the method includes displaying the at least one data item with contextually related content corresponding to the at least one data item in the focus area in response to detecting the at least one data item in the focus area.

Unlike the conventional mechanisms, the proposed method can be used to create a dynamic list user interface (UI). The dynamic list UI includes a focus area defined by the user within a graphical window of an application displayed on a screen of the electronic device. Further, the proposed method allows the list items to expand progressively towards a screen space area, gradually reveals relevant/meaningful content for the user to consume or interact with the content. Further, the focus area is sensitive to the scroll speed and is disabled on fast scroll/flick (when the user intends to navigate and focus on the content).

The proposed method can be utilized to improve the user experience (UX) with the electronic device. The proposed method can be implemented in many applications (e.g., phone call logs, contact list, message list, music playlist, settings list and or the like), third party applications or any other applications having a list view for displaying the content.

The proposed method supports a dynamic display of the data items along with contextually relevant content. In the conventional mechanisms, the list item is static without user interaction. However, the proposed method can be used to allow a dynamic display of the data items along with contextually relevant content corresponding to each data item. The proposed method allows data item to progressively expand and display more information in the focus area. The proposed method can be used to allow the user to decide the focus area on the screen, where each data item is displayed with meaningful content corresponding to the list item. The proposed method supports a customization of the information level on the list UI, such that the user can control the level of information displayed in the focus area of the list UI. This will affect the expansion and layout of the list elements in focused state.

The proposed method provides enhanced information upfront (i.e., the user can consume enhanced information for each list item upfront in the list view without navigating to deeper levels in the list item). Further, opacity of each list item's background is enhanced dynamically in the focus area, making it easier for the user to recognize/identify the list item.

Referring now to the drawings, and more particularly to FIGS. 1 through 12, where similar reference characters denote corresponding features consistently throughout the figures, there are shown various embodiments.

FIG. 1 illustrates an electronic device 100 displaying a contact application in which each contact item in a focus area 102 is expanded to display a contextually related content, according to an exemplary embodiment as disclosed herein. As depicted in the FIG. 1, the electronic device 100 displays the contact application. The focus area 102 is shown at the center of a graphical window of the contact application. Although the focus area 102 is shown at the center of the graphical window of the contact application, the position of the focus area 102 can be varied by the user according to the requirement.

When the user performs a gesture (i.e., a scroll gesture) on the contact application, the contact items pass through the focus area 102. In the focus area 102, the contact items are automatically expanded to display contextually relevant content corresponding to each contact item. For example, as shown in the FIG. 1, three contact items namely Adaline lawson, Adolph Matt and Ahmed Md are detected in the focus area 102. After detecting the contact items in the focus area 102, the electronic device 100 causes to display each contact item with the contextually relevant data item. As shown in the FIG. 1, the contact item, named Adaline lawson is partially expanded to display the contextually relevant information corresponding to the contact item (i.e., Adaline lawson). Further, the contact item, named Adolph Matt is expanded to display the contextually relevant information corresponding to the contact item (i.e., Adolph Matt). Furthermore, the contact item, named Ahmed Md is partially expanded to display the contextually relevant information corresponding to the contact item (i.e., Ahmed Md). In a similar manner, as the user scrolls through each contact item in the contact application, the electronic device 100 displays each contact item with contextually relevant content that corresponds to the each contact item. Further, electronic device 100 displays each contact item in a normal list view, when each contact item leaves the focus area 102 during scrolling. It should be noted that each contact item automatically contracts to display only the contact item, upon leaving the focus area 102. Further, the opacity of background of the data item(s) in the focus area 102 is dynamically varied to identify or to recognize the data item(s).

FIG. 2 is an example illustration in which the focus area 102 is partitioned for displaying data items with contextually relevant content, according to an exemplary embodiment as disclosed herein. As shown in the FIG. 2, the focus area 102 includes a semi focus area 102a, an in-focus area 102b and a semi-focus area 102c. The data items entering the focus area 102 pass through the semi-focus area 102a, the in-focus area 102b and the semi-focus area 102c. In the semi-focus areas 102a and 102c, the data items are partially expanded to display the contextually relevant content corresponding to the data items, whereas in the in-focus area 102b, the data items are fully expanded to display all the contextually relevant information corresponding to the data items. It should be noted that the data item in the in-focus area 102b displays more contextual information when compared to the data item in the semi-focus areas 102a and 102c. The level of the contextually related content displayed in the in-focus area 102b is greater than a level of the contextually related content displayed in the semi-focus area 102a. The level of the contextually related content indicates extent of details to which the data item expands to display the contextually related content. The in-focus area 102b has a greater extent of details to display the contextually relevant information, whereas the semi-focus area 102a or 102c has relatively smaller extent of details to display the contextually relevant information. Thus, the level of contextually related content displayed in the in-focus area 102b is greater that the level of contextually related content displayed in the semi-focus area 102a or 102c.

When the user opens an application (e.g., a contact application, a gaming application or the like), the in-focus area 102b is detected at the top of the application, and a semi in-focus area 102c card is detected adjacent (below) the in-focus area 102b.

When the in-focus area 102b is detected at the top of the list item within the application, then the first item in the list is completely in the in-focus area 102b and the list item below that is displayed in the semi-focus area 102c. Further, during the gesture operation, the in-focus area 102c is detected in the middle of the screen of the electronic device 100. When the last list item is reached in response to gesture operation, the in-focus area 102b is detected the end of the list. Thus, the last list item is completely in the in-focus area 102b and the list item above that is detected in the semi-focus area 102a.

FIGS. 3A-3C are example illustration in which one or more contact items are dynamically expanded to display contextually relevant content in the focus area based on a gesture on the contact application, according to an exemplary embodiment as disclosed herein. As depicted in the FIG. 3A, the electronic device 100 displays the contact application. The contact items Adaline lawson, Adolph Matt and Ahmed Md are in the semi-focus 102a, the in-focus area 102b and the semi-focus area respectively. The contact item 'Adaline lawson' is partially expanded in the semi-focus area 102a to display the contextually relevant content. The contact item Adolph Matt is fully expanded in the in-focus area 102b and the contact item Ahmed Md is partially expanded in the semi-focus area 102c to display the contextually relevant content.

When the user performs the scroll gesture over the list of contacts in the contact application, the contact items namely Adolph Matt, Ahmed Md and Aidan Knowels are in the semi-focus 102a, the in-focus area 102b and the semi-focus area 102c respectively to display contextually relevant content, as shown in the FIG. 3B.

When the user further scrolls over the list of contacts in the contact application, the contact items Ahmed Md, Aidan Knowels and Alec Baldwin are in the semi-focus 102a, the in-focus area 102b and the semi-focus area 102c to display contextually relevant content as shown in the FIG. 3B. Hence, when the user scrolls over the list of contacts, each contact item dynamically expands (i.e., partially expands in the semi-focus areas 102a and 102c, and completely expands in the in-focus area 102b) upon entering the focus area 102 and contracts upon leaving the focus area 102 as shown in the FIGS. 3A-3C.

FIGS. 4A and 4B are example illustrations in which the focus area 102 is dynamically enabled on the screen of the electronic device 100 based on a scroll speed of the data item, according to an exemplary embodiment as disclosed herein. As depicted in the FIG. 4A, when the user performs a flick gesture (i.e., a fast scroll) on the application, the focus area 102 is disabled, since the user has no intention to view any of the item in the application as the flick gesture is performed. Thus, the focus area 102 is disabled in response to the flick gesture from the user while the speed of the scroll is relatively high. It should be noted that, when the user performs the gesture (e.g., flicking function, fast scrolling function, or the like) on the list view of the application, the in-focus area disappears and the in-focus area is hidden in the existing list view.

As depicted in the FIG. 4B, when the user stops fast scrolling over the contact items, the focus area 102 is dynamically enabled to display each contact item with contextually relevant content corresponding to the contact item as shown in the FIG. 4B. It should be noted that the focus area 102 is dynamically enabled and disabled based on a scroll speed of the list containing the data items. When the scroll speed of the list containing the data item is detected to be greater than a threshold value, then the focus area 102 is dynamically disabled in the graphical window on the application. Further, when the scroll speed of the list containing the data item is below the threshold value, then the focus area 102 is dynamically enabled on the application to display the data items with contextually relevant content. Hence, when the user performs a flick gesture (i.e., fast scroll), then the focus area 102 is disabled and when user performs the scroll gesture, then the focus area is dynamically enabled.

FIG. 5 illustrates various hardware components of the electronic device 100 for automatically displaying content related to the data item, according to an exemplary embodiment as disclosed herein. As depicted in the FIG. 5, the electronic device 100 includes a focus area detector 502, a gesture detector 504, a movement detector 506, a data item detector 508, storage 510, a contextually relevant content detector 512, a processor 514 and a display 516. A user may opt to implement a focus area detector 502, a gesture detector 504, a movement detector 506, a data item detector 508, a contextually relevant content detector 512, and a processor 514 as one hardware processor.

The focus area detector 502 detects the focus area on the graphical window of the application displayed on the screen of the electronic device 100. The focus area detector 502 detects the focus area anywhere within the graphical window of the application. The focus area detector 502 may use one or more schemes or techniques for identifying the focus area.

The gesture detector 504 detects the gesture performed on the application. The gesture detector 504 detects the type of gesture i.e., a scroll gesture, tapping, a flick gesture or any other motion gesture performed on the application.

The movement detector 506 detects the speed of the gesture performed on the application. For example, the movement detector 506 detects a flick gesture as a gesture performed with high speed and a scroll gesture as a gesture performed with normal speed. Thus, the movement detector 506 detects the speed of the gesture based on the type of the gesture performed on the application. The movement detector 506 analyzes the movement of the data items in application in response to the based on the speed of the gesture performed on the application.

The data item detector 508 detects the type of data item in the application. For example, the data item detector 508 can detect a data item as a contact item when a contact application is launched. In another example, the data item detector 508 can detect a data item as a message, when a message application is launched in the electronic device 100. In another example, the data item detector 508 can detect a data item as an image editor, when a camera application is launched in the electronic device 100.

The storage 510 includes a plurality of applications, a plurality of data items of the applications, contextually relevant content corresponding to the data items of the applications, training models, learning models, semantic classifiers or the like. The storage 510 may include one or more computer-readable storage media. The storage 510 may include non-volatile storage elements. Examples of such non-volatile storage components may include magnetic hard disc, optical discs, floppy discs, flash memories, SSDs (solid state disc), electrically programmable read only memories (EPROM) or electrically erasable and programmable read only memories (EEPROM). In addition, the storage 510 may, in some examples, be considered a non-transitory storage medium. The term "non-transitory" may indicate that the storage medium is not embodied in a carrier wave or a propagated signal. However, the term "non-transitory" should not be interpreted that the storage 510 is non-movable. In some examples, the storage 510 can be configured to store larger amounts of information. In certain examples, a non-transitory storage medium may store data that can, over time, change (e.g., in Random Access Memory (RAM) or cache).

The contextually relevant content detector 512 detects the contextually relevant content corresponding to a detected data item. For example, if the detected data item is a contact item, the contextually relevant content detector 512 detects the contextually relevant content as current location of the contact, occupation of contact, most recent mode of communication with the contact, recently received notifications or message from the contact or the like. The contextually relevant information corresponding to the contact item may also include a communication icon for communicating with the contact, a text indicating a recent communication made with the contact, suitable date and time to communicate with the contact, any personalized information associated with the contact (if available) or the like. The contextually relevant content detector 512 detects the contextually relevant content corresponding to a detected data item using one or more machine learning techniques, statistical models, and semantic models for determining the contextually relevant information. The contextually relevant content detector 512 includes one or more components or elements for determining the contextually relevant information corresponding to the data item. The functionalities of the one or more components or elements for determining the contextually relevant information corresponding to the data item are described in the FIG. 6.

The processor 514 can be a central processing unit (CPU), a graphical processing unit (GPU) or any other processing element that executes one or more instructions for automatically displaying content relevant to the data item.

The display 516 is capable of being utilized to display on the screen of the electronic device 100. In an exemplary embodiment, the display 516 can be, for e.g., a Cathode Ray Tube (CRT), a Liquid Crystal Display (LCD), Organic Light-Emitting Diode (OLED), a Light-emitting diode (LED), Electroluminescent Displays (ELDs), field emission display (FED), LPD (light emitting polymer display), etc. The display 516 can be configured to display the one or more UI of the variety of applications. The display 516 can be coupled (or, communicatively coupled) with the processor 514 and the storage 510.

FIG. 6 illustrates various components of a contextually relevant content detector 510 of the electronic device 100, according to an exemplary embodiment as disclosed herein. As depicted in the FIG. 6, the contextually relevant content detector 510 includes a data item analyzer 510a, an event analyzer 510b, a contextual modeling manager 510c, a content organizer 510d. A user may opt to implement the contextually relevant content detector 510 includes a data item analyzer 510a, an event analyzer 510b, a contextual modeling manager 510c, a content organizer 510d as one hardware processor.

The data item analyzer 510a analyzes a data item detected in the focus area. The data item analyzer 510a analyzes the data item by parsing the data item to understand the data item for determining the category of the data item. For example, in a message application, the data item analyzer 510a identifies the data item (i.e., a name of the sender of the message) by parsing the data item. The data item analyzer 510a utilizes natural language processing (NLP) techniques to determine the data item as the name of the sender of the message. Further, the data item analyzer 510a understands the detected data item for categorizing the data item as the sender of the message.

The event analyzer 510b analyzes the data item to determine whether there are any events that are associated with the data item. The events associated with the data item may include a birth day event, a marriage anniversary event, a service anniversary event, a meeting event or the like.

The contextual modeling manager 510c determines the contextual controls or actions, contextual data and so on corresponding to the detected data item. For example, if a contact in the application is identified to be residing in United States (US), then the contextual modeling manager 510c determines the current time zone and compares the current the time zone with time zone of US and can suggest the user to send a message to the contact rather than a call. Accordingly, a contextual control such as messaging icon may be provided for sending the message. Thus, when the contact is detected in the focus area, the contextual modeling manager 510c can suggest the user to send a message to the contact rather than a call by identifying the context of the contact. The contextual modeling manager 510c may utilize one or more learning models or training models for determining the context of the contact or any other data item.

The content organizer 510d organizes the contextually relevant content of the data item in a meaningful manner. For example, the content organizer may organize the contextually relevant content of a contact item in an orderly manner such as location details of the contact, occupation of the contact, recent mode of communication and so on, below the data item.

FIG. 7 is a flow diagram 700 illustrating a method for automatically displaying content related to the data item, according to an exemplary embodiment as disclosed herein. At step 702, an electronic device 100 detects the focus area within the graphical window of an application displayed on a screen of the electronic device 100. The method allows the focus area detector 502 to detect the area within the graphical window of an application displayed on a screen of the electronic device 100.

At step 704, the electronic device 100 detects the data item(s) of the application in the focus area 102. The electronic device 100 allows data item detector 508 to detect the data item(s) of the application in the focus area 102.

At step 706, the electronic device 100 displays the one or more data items with contextually related content corresponding to the at least one data item in the focus area 102. The method allows the contextually relevant content detector to display the one or more data items with contextually related content corresponding to the at least one data item in the focus area 102.

The various actions, acts, blocks, steps, etc., as illustrated in the FIG. 7 may be performed in the order presented, in a different order, or simultaneously. Further, in some embodiments, some of the actions, acts, blocks, steps, etc., may be omitted, added, modified, skipped, etc., without departing from the scope of the disclosure.

FIGS. 8A-8D are example illustrations in which the data items are displayed with contextually relevant content in the focus area, according to an exemplary embodiment as disclosed herein. As depicted in the FIG. 8A, when the contact application is launched on the electronic device 100, the contact item in the in-focus area 102b is displayed with all the contextually relevant content. The in-focus area 102b displays the contact item "Aidan Knowles" with contact number (+1-380-516-2465), occupation (Gym instructor), location information (i.e., Cincinnati (current), Columbus (Home) and a recent communication made with the contact (i.e., When are you coming back (2 weeks ago)).

Further, the contact item in the semi-focus area 102a or 102c displays the contact item (i.e., Aidan Knowles") with brief information such as, for example, contact number (+1-380-516-2465), occupation (Gym instructor). Hence, it should be noted that contact item in the in-focus area 102b displays more contextual information compared to the contact item in the semi-focus 102a or 102c as shown in the FIG. 8A.

As depicted in the FIG. 8B, when call logs application is launched in the electronic device 100, the contact item in the in-focus area 102b is displayed with all the contextually relevant content. The in-focus area 102b displays the contact item "John Smith" with contact number (+1-345-456-8989) and the text message as "call me back soon"

Further, the contact item in the semi-focus area 102a or 102c displays the contact item (i.e., "John Smith") with contact number (+1-345-456-8989) only. Hence, it should be noted that contact item in the in-focus area 102b displays more contextual information when compared to the contact item in the semi-focus are 102a or 102c as shown in the FIG. 8B.

As depicted in the FIG. 8C, when the message application is launched in the electronic device 100, the contact item in the in-focus area 102b is displayed with all the contextually relevant content. The in-focus area 102b displays the sender "John Smith" with a complete text message.

Further, the contact item in the semi-focus area 102a or 102c displays the contact item (i.e., John Smith") with a partial text message as shown in the FIG. 8C. Hence, it should be noted that contact item in the in-focus area 102b displays more contextual information when compared to the contact item in the semi-focus are 102a or 102c as shown in the FIG. 8C.

As depicted in the FIG. 8D, when the settings menu is launched in the electronic device 100, the data item in the in-focus area 102b is displayed with all the contextually relevant content. The in-focus area 102b displays the data item (i.e., Wi-Fi) with contextually relevant content as 'not connected', 'scan' and 'searching available connections'.

Further, the data item in the semi-focus area 102a or 102c displays the contact item (i.e., "Bluetooth") with a partial text message as shown in the FIG. 8D. Hence, it should be noted that contact item in the in-focus area 102b displays more contextual information when compared to the contact item in the semi-focus are 102a or 102c as shown in the FIG. 8D.

FIG. 9 is a flow diagram illustrating a method for displaying the one or more data items with contextually relevant information in the focus area based on an event detected in the electronic device, according to an exemplary embodiment as disclosed herein. At step 902, the method includes detect an event corresponding to a data item of an application in the electronic device 100. The method allows the event analyzer 510b to detect an event corresponding to a data item of an application in the electronic device 100.

At step 904, the method includes detecting one or more data items of the application in the focus area 102. The method allows the data item detector 508 to detect the one or more data items of the application in the focus area 102.

At step 906, the method includes causing to display the one or more data items with contextually related content corresponding to the at least one data item in the focus area 102. The method allows the contextually relevant content detector 510 to display the one or more data items with contextually related content corresponding to the at least one data item in the focus area 102.

FIG. 10 is an example illustration in which the data item is displayed with contextually relevant information in the focus area based on an event detected in the electronic device, upon launching an application, according to an exemplary embodiment as disclosed herein. As depicted in the FIG. 10, the electronic device 100 displays the contact (i.e., Alice Scott) due to detected event (i.e., the birthday event) in the in-focus area 102b. In this example, when the user launches the contact application for the first time, the event analyzer 510b detects the event associated with the contact in the contact application. When the event is detected, the contact is displayed at the top of the contact list as shown in the FIG. 10, as the event analyzer considers the event as a priority event. The event analyzer 510b notifies the user about the event associated with the contact when the contact application is launched for the first time. In case, there is no event detected, then the contact is displayed according to chronological order.

FIG. 11 is a flow diagram 1100 illustrating a method for dynamically shifting the focus area for viewing the one or more data items with contextually relevant content, according to an exemplary embodiment as disclosed herein. At step 1102, the method includes detecting the focus area 102 on the screen of the electronic device 100 at a first position. The method allows the focus area detector 502 to detect the focus area 102 on the screen of the electronic device 100 at the first position.

At step 1104, the method includes detecting the focus area 102 at a second position based on an input received from user. The method allows the focus area detector 502 to detect focus area 102 at the second position based on an input received from user. For example, the user performs a long press on the focus area 102 to select the focus area and drags the focus area to the second position.

At step 1106, the method includes detecting the one or more data items in the focus area 102 at the second position. The method allows the data item detector to detect the one or more data items in the focus area at the second position.

At step 1108, the method includes causing to display contextually related content corresponding to the one or more data items in the focus area 102 at the second position. The method allows the contextually relevant content detector 512 to display the contextually related content corresponding to the one or more data items in the focus area at the second position.

The various actions, acts, blocks, steps, etc., as illustrated in the FIG. 11 may be performed in the order presented, in a different order, or simultaneously. Further, in some embodiments, some of the actions, acts, blocks, steps, etc., may be omitted, added, modified, skipped, etc., without departing from the scope of the disclosure.

FIGS. 12A-12C are example illustrations in which the focus 102 area is shifted from a first position to a second position based on an input received from the user, according to an exemplary embodiment as disclosed herein. As depicted in the FIG. 12A, when the contact application is launched in the electronic device 100, the focus area 102 is displayed at the first position (i.e., at top position in the contact application). When the focus area 102 is at the top, the user wishes to view a contact item (which is present below in the list of contact items) quickly. In such case, the focus area is held by a gesture such as long press, 3D touch and so on, in order to shift the focus area from the first position to the second position (i.e., to the desired contact item as shown in the FIG. 12B. Further, when the focus area 102 is shifted from the first position to the second position, then the contact items in the focus area 102 are expanded dynamically too display the contextually relevant content in the semi focus area 102a, the in-focus area 102b and the semi-focus area 102c as shown in the FIG. 12C.

The exemplary embodiments disclosed herein can be implemented through at least one software program running on at least one hardware device and performing network management functions to control the elements. The elements shown in the FIGS. 1 to 12 include blocks which can be at least one of a hardware device, or a combination of hardware device and software module.

In an exemplary embodiment, the electronic device 100 may detect a focus area within a graphical window of an application displayed on a screen of the electronic device, detect at least one data item of the application in the focus area. The electronic device 100 then displays the at least one data item and contextually related content corresponding to the at least one data item in the focus area in response to the detecting. Next, a user may make a gesture input of scrolling the list containing a plurality of data items, for instance, in an upper direction. In response to such scrolling gesture input, the focus moves or is shifted in the scrolling direction of the list containing the at least one data item. As the focus area moves, a second data item and content corresponding to the second data item included in the shifted focus area displayed. Displaying of the contextually related content corresponding to the at least one data item is ceased in response to the shifting of the focus area.

In an exemplary embodiment, the electronic device 100 may detect a focus area within a graphical window of an application displayed on a screen of the electronic device, detect at least one data item of the application in the focus area. The electronic device 100 then displays the at least one data item with contextually related content corresponding to the at least one data item in the focus area in response to the detecting. Next, a user may make a gesture input of scrolling the data item, for instance, in an upper direction. In response to such scrolling gesture input, the focus area moves or is shifted in a direction opposite to the scrolling direction of the list containing the at least one data item. As the focus area moves, a second data item and content corresponding to the second data item included in the shifted focus area displayed. Displaying of the contextually related content corresponding to the at least one data item is ceased in response to the shifting of the focus area.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for displaying content by an electronic device, the method comprising:
    detecting a focus area within a graphical window of an application displayed on a screen of the electronic device, wherein the focus area includes an in-focus area and a semi-focus area;
    detecting a plurality of items of the application in the focus area, wherein a first data item of the plurality of data items is detected in the in-focus area, and a second data item of the plurality of data items is detected in the semi-focus area; and
    displaying each of the plurality of data items with respective contextually related content corresponding there to, in the focus area in response to the detecting,
    wherein first contextually related content corresponding to the first data item is displayed with the first data item in the in-focus area, and second contextually related content corresponding to the second data item is displayed with the second data item in the semi-focus area, and
    wherein an amount of the first contextually related content corresponding to the first data item displayed with the first data item in the in-focus area is greater than an amount of the second contextually related content corresponding to the second data item displayed with the second data item in the semi-focus area.

2. The method of claim 1, wherein the detecting the focus area comprises detecting the focus are in response to an execution of an application containing the plurality of data items in the electronic device, wherein the focus area is a pre-defined region.

3. The method of claim 1, wherein the detecting the plurality of data items comprises detecting the plurality of data items in response to a gesture input on at least one of the plurality of data items.

4. The method of claim 3, wherein the focus area is dynamically enabled and disabled based on a scroll speed of the plurality of data items.

5. The method of claim 4, wherein an opacity of the background of the plurality of data items varies dynamically in the focus area.

6. The method of claim 1, further comprising displaying the contextually related content in the focus area expanded from the plurality of data items.

7. The method of claim 1, further comprising displaying the plurality of data items contracted upon leaving the focus area.

8. The method of claim 1, wherein the contextually related content comprises at least one of application data, an application icon and controls respectively corresponding to the plurality of data items.

9. The method of claim 1, wherein the plurality of data items are dynamically selected to display the plurality of data items with contextually relevant information in the focus area.

10. The method of claim 9, wherein the plurality of data items are selected based on at least one detected event in the electronic device, upon launching the application containing the plurality of data items.

11. The method of claim 1, further comprising:
   shifting the focus area in an opposite direction to a scrolling direction of the plurality of data items; and
   displaying a second data item and contextually related content corresponding to the second data item in the shifted focus area,
   wherein the displaying the contextually related content corresponding to the plurality of data items is ceased in response to the shifting of the focus area.

12. A method for displaying content related to a data item, by an electronic device, the method comprising:
   detecting a focus area within a graphical window of an application on a screen of the electronic device at a first position, wherein the focus area includes an in-focus area and a semi-focus area;
   detecting the focus area within the graphical window of the application at a second position based on an input received from a user;
   detecting a plurality of data items in the focus area, wherein a first data item of the plurality of data items is detected in the in-focus area, and a second data item of the plurality of data items is detected in the semi-focus area; and
   displaying contextually related content respectively corresponding to each of the plurality of data items in the focus area at the second position in response to the detecting the plurality of data items in the focus area,
   wherein first contextually related content corresponding to the first data item is displayed with the first data item in the in-focus area, and second contextually related content corresponding to the second data item is displayed with the second data item in the semi-focus area, and
   wherein an amount of the first contextually related content corresponding to the first data item displayed with the first data item in the in-focus area is greater than an amount of the second contextually related content corresponding to the second data item displayed with the second data item in the semi-focus area.

13. An electronic device for automatically displaying content, the electronic device comprising:
   a processor configured to:
      detect a focus area within a graphical window of an application displayed on a screen of the electronic device, wherein the focus area includes an in-focus area and a semi-focus area, and
      detect a plurality of data items of the application in the focus area, wherein a first data item of the plurality of data items is detected in the in-focus area, and a second data item of the plurality of data items is detected in the semi-focus area; and
   a display configured to display each of the plurality of data items with contextually related content respectively corresponding thereto in the focus area, in response to the detecting the plurality of data items in the focus area,
   wherein first contextually related content corresponding to the first data item is displayed with the first data item in the in-focus area, and second contextually related content corresponding to the second data item is displayed with the second data item in the semi-focus area, and
   wherein an amount of the first contextually related content corresponding to the first data item displayed with the first data item in the in-focus area is greater than an amount of the second contextually related content corresponding to the second data item displayed with the second data item in the semi-focus area.

* * * * *